United States Patent
Karaorman et al.

(10) Patent No.: US 6,631,346 B1
(45) Date of Patent: Oct. 7, 2003

(54) METHOD AND APPARATUS FOR NATURAL LANGUAGE PARSING USING MULTIPLE PASSES AND TAGS

(75) Inventors: Murat Karaorman, Santa Barbara, CA (US); Jean-Claude Junqua, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/287,810

(22) Filed: Apr. 7, 1999

(51) Int. Cl.[7] ................. G06A 17/27; G10L 11/00
(52) U.S. Cl. ........................... 704/9; 704/275
(58) Field of Search .................... 704/1, 8, 9, 10, 704/270, 275; 707/530, 531

(56) References Cited

U.S. PATENT DOCUMENTS

| | | | | |
|---|---|---|---|---|
| 5,418,717 A | * | 5/1995 | Su et al. | 704/8 |
| 5,745,776 A | * | 4/1998 | Sheppard, II | 704/10 |

* cited by examiner

*Primary Examiner*—Patrick N. Edouard
(74) *Attorney, Agent, or Firm*—Harness, Dickey & Pierce, PLC

(57) ABSTRACT

A computer-implemented speech parsing method and apparatus for processing an input phrase. The method and apparatus include providing a plurality of grammars that are indicative of predetermined topics. A plurality of parse forests are generated using the grammars. Tags are associated with words preferably according to a scoring scheme utilizing the generated parse forests while parsing the input phrase. The tags that are associated with the words are used as a parsed representation of the input phrase.

61 Claims, 13 Drawing Sheets

```
* COST.
COST    =       C_Core.
C_Core  = C_Gen |
          C_Phr |
          C_Qualified |
          C_Interval |
          X C_Core |
          C_Core X.
C_Gen   =   C_Num |
            C_Num C_Currency.
C_Num   = C_Thousands C_Hundreds C_Tens |
          C_Thousands C_Hundreds |
          C_Thousands |
          C_Hundreds C_Tens |
          C_Hundreds |
          C_Tens |
          X C_Num.
C_Thousands = C_Tens c_thousand |
              c_thousand.
C_Hundreds  = C_Tens c_hundred |
              c_hundred.
C_Tens  =     c_num |
              c_num c_numToTen.
C_Currency = c_yen |
             c_dollar |
             X C_Currency.
C_Phr = c_cheapest | c_least | c_least c_expensive.
C_Qualified =   c_qualifier C_Gen.
C_Interval  =   c_between C_Gen C_Gen.
X = x | X x.
XX = x x | x.
c_yen:  yen yens.
c_dollar: dollar dollars.
c_cheapest: cheapest.
c_least:    least.
c_expensive: expensive.
c_qualifier: under below less.
c_between:  between.
c_thousand: thousand.
c_hundred:  hundred.
c_num: one two three four five six seven eight nine ten eleven
       twelve thirteen fourteen fifteen sixteen seventeen
       eighteen nineteen twenty thirty forty fifty sixty seventy
       eighty ninety.
c_numToTen: one two three four five six seven eight nine.
x.
```

FIG. 9

METHOD AND APPARATUS FOR NATURAL LANGUAGE PARSING USING MULTIPLE PASSES AND TAGS

BACKGROUND AND SUMMARY OF THE INVENTION

The present invention relates to speech analysis, and more particularly to a computer-implemented natural language parser.

Understanding the meaning of a natural language sentence is the cornerstone of many fields of science with implications as broad ranging as from how humans interact with computers or machines to how they can interact with other intelligent agents, human or machine, through translation systems. The task becomes more complicated when the sentence is obtained using an automatic speech recognition system (ASR), where recognition errors such as insertions, omissions or substitutions can render the sentence less intelligible even to a human. Additional user-interface related factors might also introduce an element of un-naturalness to the speakers own utterance, so that the recognized sentence may contain the affects of user's hesitations, pauses, repetitions, broken phrase or sentences.

Due to these factors, parsing natural language sentences occupies an important area in computer-implemented speech-related systems. However, current approaches for natural language parsers typically experience relatively sub-optimal robustness in handling the aforementioned errors of an automatic speech recognition system. The present invention overcomes the aforementioned disadvantages as well as other disadvantages.

In accordance with the teachings of the present invention, a computer-implemented speech parsing method and apparatus for processing an input phrase is provided. The method and apparatus include providing a plurality of grammars that are indicative of predetermined topics. A plurality of parse forests are generated using the grammars, and tags are associated with words in the input phrase using the generated parse forests. The tags that are associated with the words are used as a parsed representation of the input phrase.

For a more complete understanding of the invention, its objects and advantages, reference should be made to the following specification and to the accompanying drawings.

BRIEF DESCRIPTION OF THE DRAWINGS

FIG. 9 is a computer screen display of an exemplary cost grammar;

DESCRIPTION OF THE PREFERRED EMBODIMENT

Figure 1:
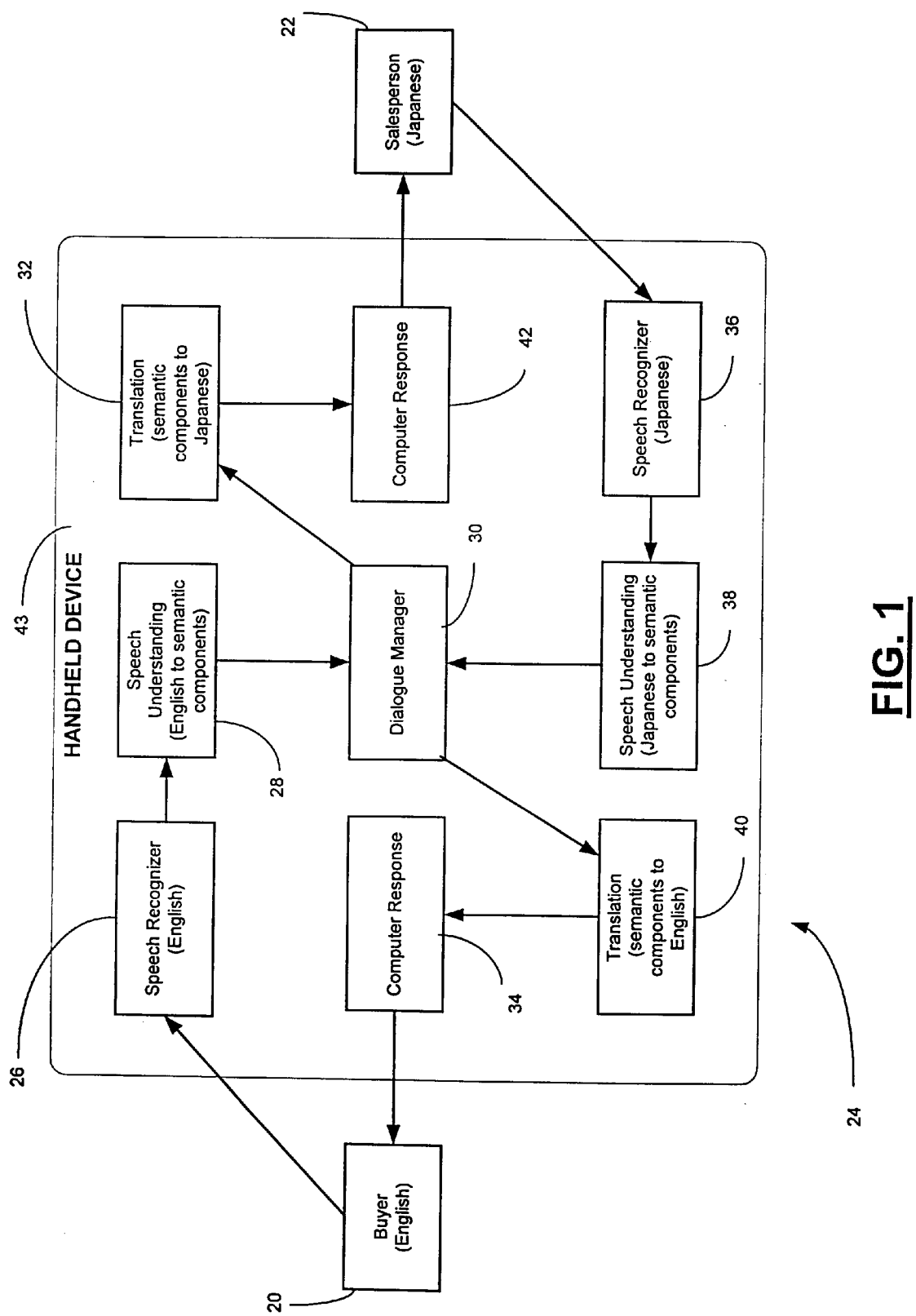
FIG. 1 is a block diagram depicting the computer-implemented components utilized to effect a dialog between at least two people with different languages.

FIG. 1 depicts a computer-implemented dialog continuous speech processing system for allowing two people who speak different languages to effectively communicate. In the non-limiting example of FIG. 1, a buyer 20 wishes to communicate with salesperson 22 in order to purchase a piece of merchandise. The difficulty arises in that buyer 20 speaks only English while salesperson 22 speaks only Japanese.

The dialog speech processing system 24 of the present invention uses a speech recognizer 26 to transform the English speech of buyer 20 into a string of words. The string of words is read as text by a speech understanding module 28 which extracts the semantic components of the string.

A dialog manager 30 determines whether a sufficient amount of information has been provided by buyer 20 based upon the semantic components determined by speech understanding module 28. If a sufficient amount of information has been provided, dialog manager 30 allows translation module 32 to translate the buyer's speech from the determined semantic components to Japanese. Translation module 32 translates the semantic components into Japanese and performs speech synthesis via computer response module 42 in order to vocalize the Japanese translation for salesperson 22 to hear.

Salesperson 22 then utilizes the dialog speech processing system 24 to respond to buyer 20. Accordingly, a Japanese speech recognizer 36 and Japanese speech understanding module 38 respectively perform speech recognition of the speech of salesperson 22 if insufficient information has been provided by salesperson 22.

If dialog manager 30 determines that an insufficient amount of information has been provided by buyer 20 for accomplishing a predetermined goal (such as purchasing a piece of merchandise), dialog manager 30 instructs a computer response module 34 to vocalize a response which will ask buyer 20 to provide the missing piece(s) of information.

The preferred embodiment is suitable for implementation in a hand-held computer device 43 where the device is a tool allowing the user to formulate his or her request in the target language. Such a portable hand-held device is well suited for making a ticket/hotel reservation in a foreign country, purchasing a piece of merchandise, performing location directory assistance, or exchanging money. The preferred embodiment allows the user to switch from one task to another by selecting on the hand-held device which task they would like to perform. In an alternate embodiment, a flash memory card which is unique to each task can be provided so that a user can switch from one task to another.

Figure 2:
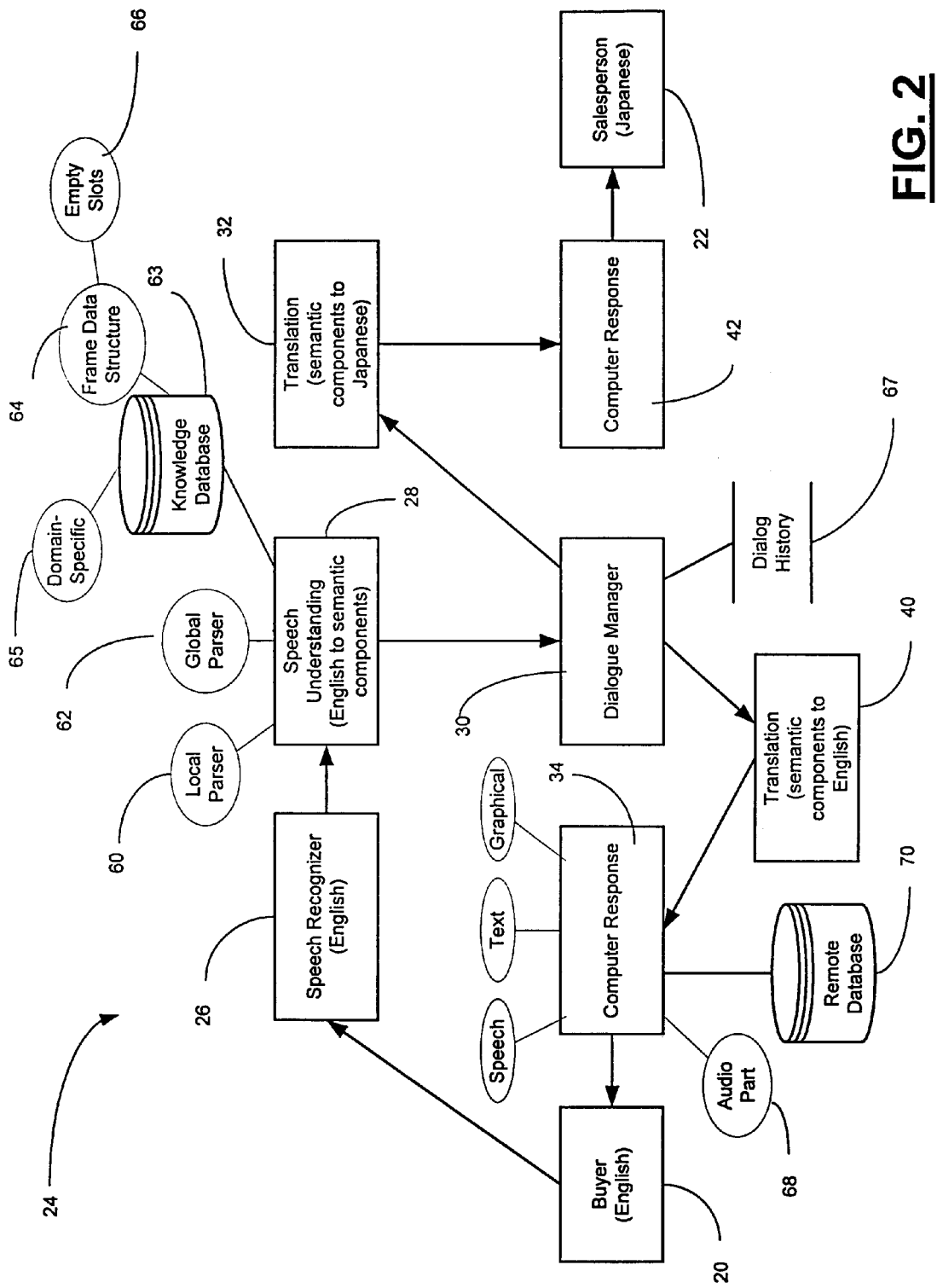
FIG. 2 is a block diagram depicting the components of the system of FIG. 1 in more detail.

FIG. 2 depicts components of the dialog speech processing system 24 in more detail. In particular, speech understanding module 28 includes a local parser 60 to identify predetermined relevant task-related fragments. Speech understanding module 28 also includes a global parser 62 to extract the overall semantics of the buyer's request.

The novel local parser 60 utilizes in the preferred embodiment small and multiple grammars along with several passes and an unique scoring mechanism to provide parse hypotheses. For example, the novel local parser recognizes according to this approach phrases such as dates, names of cities, and prices. If a speaker utters "get me a flight to Boston on January 23rd which also serves lunch", the local parser recognizes: "Boston" as a city name; "January 23rd" as a date; and "lunch" as being about a meal. The global parser assembles those items (city name, date, etc.) together and recognizes that the speaker wishes to take an airplane ride with certain constraints.

Speech understanding module 28 includes knowledge database 63 which encodes the semantics of a domain (i.e., goal to be achieved). In this sense, knowledge database 63 is preferably a domain-specific database as depicted by reference numeral 65 and is used by dialog manager 30 to determine whether a particular action related to achieving a predetermined goal is possible.

The preferred embodiment encodes the semantics via a frame data structure 64. The frame data structure 64 contains empty slots 66 which are filled when the semantic interpretation of global parser 62 matches the frame. For example, a frame data structure (whose domain is purchasing merchandise) includes an empty slot for specifying the buyer-requested price for the merchandise. If buyer 20 has provided the price, then that empty slot is filled with that information. However, if that particular frame needs to be filled after the buyer has initially provided its request, then dialog manager 30 instructs computer response module 34 to ask buyer 20 to provide a desired price.

Preferably, computer response module 34 is multi-modal in being able to provide a response to a user via speech synthesis, text or graphical. For example, if the user has requested directions to a particular location, the computer response could display a graphical map with the terms on the map being translated by translation module 40. Moreover, computer response module 40 can speak the directions to the user through audio part 68. However, it is to be understood that the present invention is not limited to having all three modes present as it can contain one or more of the modes of the computer response module 34.

Audio part 68 uses the semantics that have been recognized to generate a sentence in the buyer's target language based on the semantic concept. This generation process preferably uses a paired dictionary of sentences in both the initial and target language. In an alternate embodiment, sentences are automatically generated based on per type sentences which have been constructed from the slots available in a semantic frame.

The frame data structure 64 preferably includes multiple frames which each in turn have multiple slots. One frame may have slots directed to attributes of a shirt, such as, color, size, and prices. Another frame may have slots directed to attributes associated with the location to which the shirt is to be sent, such as, name, address, phone number.

The following reference discusses global parsers and frames: R. Kuhn and R. D. Mori, *Spoken Dialogues with Computers (Chapter 14: Sentence Interpretation)*, Academic Press, Boston (1998).

Dialog manager 30 uses dialog history data file 67 to assist in filling in empty slots before asking the speaker for the information. Dialog history data file 67 contains a log of the conversation which has occurred through the device of the present invention. For example, if a speaker utters "get me a flight to Boston on January 23rd which also serves lunch", the dialog manager 30 examines the dialog history data file 67 to check what city names the speaker may have mentioned in a previous dialog exchange. If the speaker had mentioned that he was calling from Detroit, then the dialog manager 30 fills the empty slot of the source city with the city name of "Detroit". If a sufficient number of slots have been filled, then the present invention will ask the speaker to verify and confirm the flight plan. Thus, if any assumptions made by the dialog manager 30 through the use of dialog history data file 67 prove to be incorrect, then the speaker can correct the assumption.

In another alternate embodiment computer response module 34 is instructed by dialog manager 30 to perform a search on the remote database 70 in order to provide buyer 20 with information about that piece of merchandise. In this non-limiting example, dialog manager 30 can instruct computer response module 34 to search the store's remote database 70 for the price range of the merchandise for which the buyer 20 is interested. The alternate embodiment substantially improves the quality of the dialog between buyer 20 and salesperson 22 by providing information to buyer 20 so that buyer 20 can formulate a more informed request to salesperson 22.

Dialog manager 30 assumes an integral role in the dialog by performing a back-and-forth dialog with buyer 20 before buyer 20 communicates with salesperson 22. In such a role, dialog manager 30 using the teachings of the present invention is able to effectively manage the turn-taking aspect of a human-like back-and-forth dialog. Dialog manager 30 is able to make its own decision about which direction the dialog with buyer 20 will take next and when to initiate when a new direction will be taken.

For example, if buyer 20 has requested a certain type of shirt within a specified price range, dialog manager 30 determines whether such a shirt is available within that price range. Such a determination is made via remote database 70. In this example, dialog manager 30 determines that such a shirt is not available in the buyer's price range, however, another type of shirt is available in that price range. Thus, dialog manager 30 can determine whether a particular action or goal of the buyer is feasible and assist the buyer to accomplish that goal.

The present invention analyzes and extracts semantically important and meaningful topics from a loosely structured, natural language text which may have been generated as the output of an automatic speech recognition system (ASR) used by a dialogue or speech understanding system. The present invention translates the natural language text input to a new representation by generating well-structured tags containing topic information and data, and associating each tag with the segments of the input text containing the tagged information. In an alternate embodiment, tags are generated as a separate list, or as a semantic frame.

Figure 3:
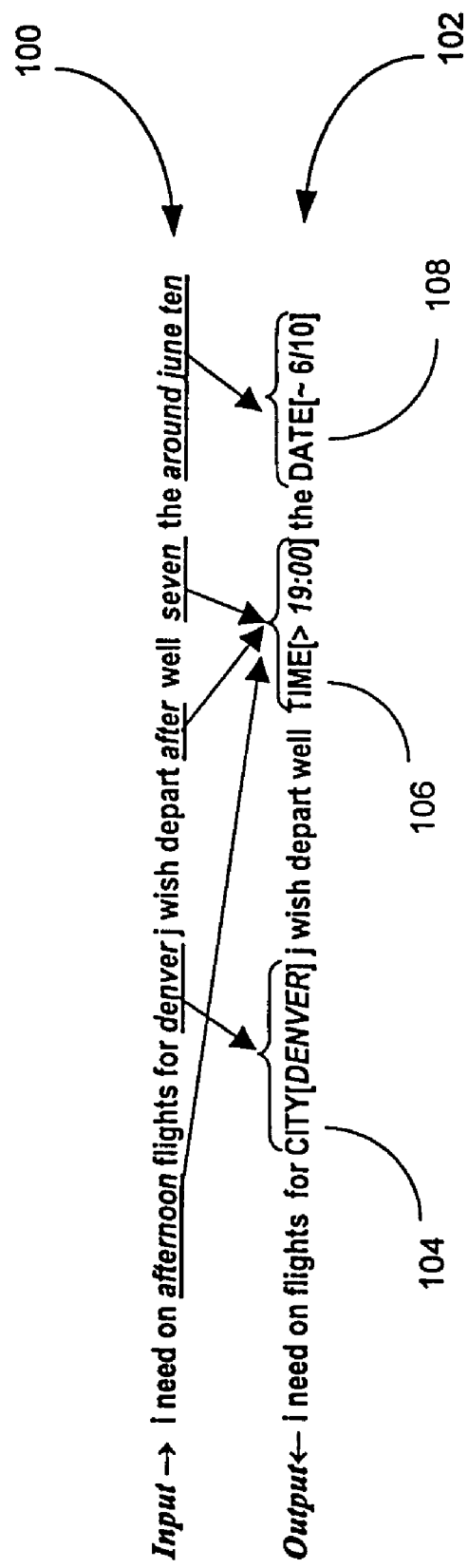
FIG. 3 is a tag generation diagram depicting the application of the semantic tag generation process to an input sentence.

FIG. 3 depicts a non-limiting example of the role of the local parser of the present invention in a speech understanding system such as, in an automated online travel reservation specialist with a speech interface. The following topics can be potential targets for the present invention: flight arrival and departure times, and dates possibly with ranges and constraints; city-names involved in the flight; fare/cost information involving currency amounts; class of seats; meal information; flight-numbers; names of airlines; the stop-overs of the flight, etc.

The example includes a possible input sentence 100 as generated from a continuous speech recognition system and containing recognition mistakes. The corresponding output 102 is a possible interpretation by the present invention where three tags have been generated, one corresponding to city-names 104, one to time 106, and one to date 108.

Robustness is a feature of the present invention as the input can contain grammatically incorrect English sentences, such as in the example above, due to he following reasons: the input to the recognizer is casual, dialog style, natural speech and can contain broken sentences, partial phrases; the speech recognition may introduce insertion, omission, or mis-recognition errors even when the speech input is considered correct. The present invention deals robustly with all types of input and extracts as much information as possible.

Figure 4:
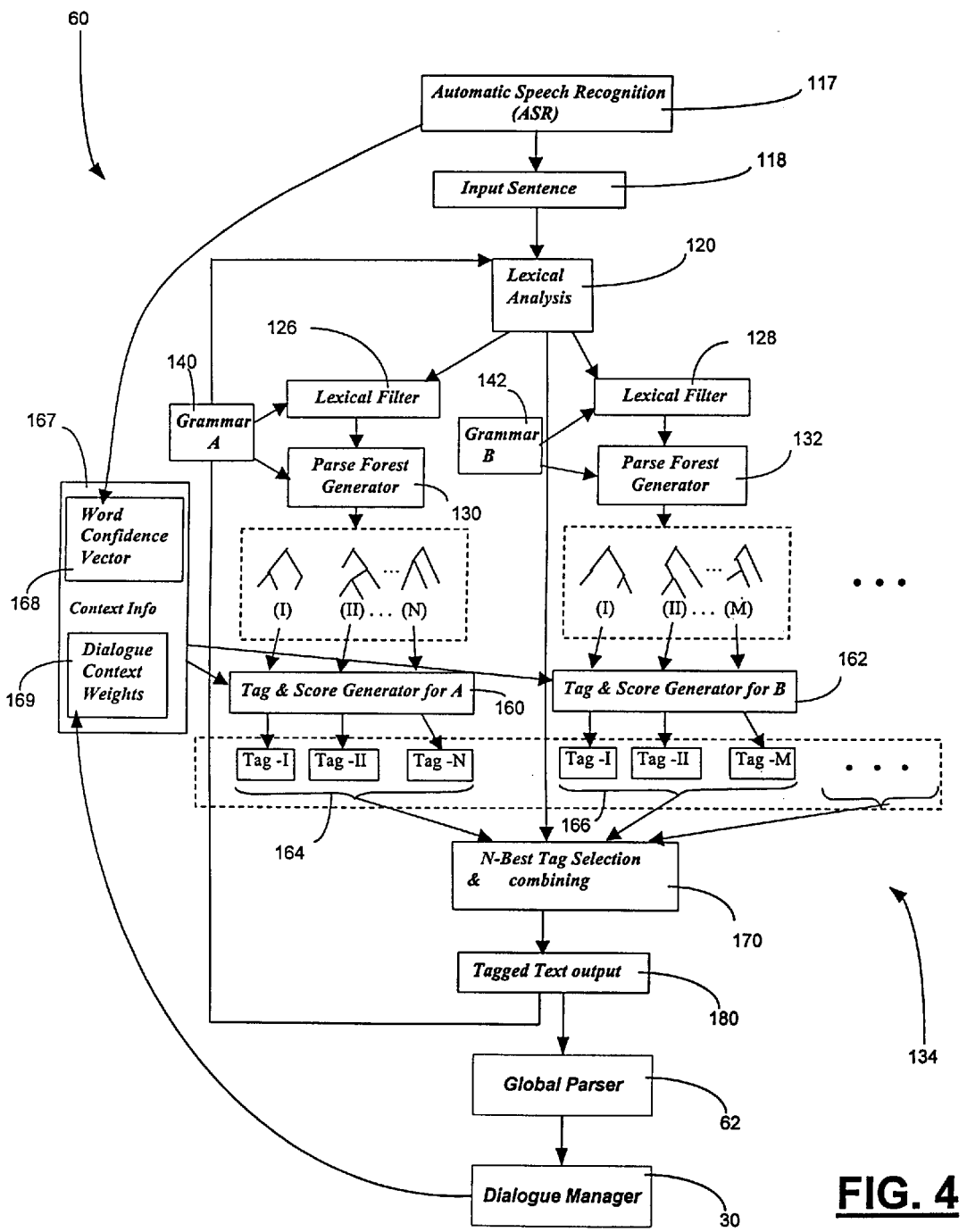
FIG. 4 is a block diagram depicting the components of the local parser of the present invention.

FIG. 4 depicts the different components of the novel local parser 60 of the present invention. The present invention preferably utilizes generalized parsing techniques in a multi-pass approach as a fixed-point computation. Each topic is described as a context-sensitive LR (left-right and rightmost derivation) grammar, allowing ambiguities. The following are references related to context-sensitive LR grammars: A. Aho and J. D. Ullman, *Principles of Compiler Design*, Addison Wesley Publishing Co., Reading, Mass. (1977); and N. Tomita, Generalized LR Parsing, Kluwer Academic Publishers, Boston, Mass. (1991).

At each pass of the computation, a generalized parsing algorithm is used to generate preferably all possible (both complete and partial) parse trees independently for each targeted topic. Each pass potentially generates several alternative parse-trees, each parse-tree representing a possibly different interpretation of a particular topic. The multiple passes through preferably parallel and independent paths result in a substantial elimination of ambiguities and overlap among different topics. The present invention is a systematic way of scoring all possible parse-trees so that the (N) best candidates are selected utilizing the contextual information present in the system.

Local parsing system 60 is carried out in three stages: lexical analysis 120; parallel parse-forest generation for each topic (for example, generators 130 and 132); and analysis and synthesis of parsed components as shown generally by reference numeral 134. The preferred embodiment depicts the structure for the inputs to and outputs from the local parser in Exhibit A below.

Lexical Analysis

A speaker utters a phrase that is recognized by an automatic speech recognizer 117 which generates input sentence 118. Lexical analysis stage 120 identifies and generates tags for the topics (which do not require extensive grammars) in input sentence 118 using lexical filters 126 and 128. These include, for example, city-names; class of seats; meal information; names of airlines; and information about stop-overs. A regular-expression scan of the input sentence 118 using the keywords involved in the mentioned exemplary tags is typically sufficient at this level. Also, performed at this stage is the tagging of words in the input sentence that are not part of the lexicon of particular grammar. These words are indicated using an X-tag so that such noise words are replaced with the letter "X".

Parallel Parse-forest Generation

The present invention uses a high-level general parsing strategy to describe and parse each topic separately, and generates tags and maps them to the input stream. Due to the nature of unstructured input text 118, each individual topic parser preferably accepts as large a language as possible, ignoring all but important words, dealing with insertion and deletion errors. The parsing of each topic involves designing context-sensitive grammar rules using a meta-level specification language, much like the ones used in LR parsing. Examples of grammars include grammar A 140 and grammar B 142. Using the present invention's approach, topic grammars 140 and 142 are described as if they were an LR-type grammar, containing redundancies and without eliminating shift and reduce conflicts. The result of parsing an input sentence is all possible parses based on the grammar specifications.

Generators 130 and 132 generate parse forests 150 and 152 for their topics. Tag-generation is done by synthesizing actual information found in the parse tree obtained during parsing.

FIG. 4 depicts tag generation via tag and score generators 160 and 162 which respectively generate tags 164 and 166. Each identified tag also carries information about what set of input words in the input sentence are covered by the tag. Subsequently the tag replaces its cover-set. In the preferred embodiment, context information 167 is utilized for tag and score generations, such as by generators 160 and 162. Context information 167 is utilized in the scoring heuristics for adjusting weights associated with a heuristic scoring factor technique that is discussed below. Context information 167 preferably includes word confidence vector 168 and dialogue context weights 169. However, it should be understood that the present invention is not limited to using both word confidence vector 168 and dialogue context weights 169, but also includes using one to the exclusion of the other, as well as not utilizing context information 167 within the present invention.

Automatic speech recognition process block 117 generates word confidence vector 168 which indicates how well the words in input sentence 118 were recognized. Dialog manager 30 generates dialogue context weights 169 by determining the state of the dialogue. For example, dialog manager 30 asks a user about a particular topic, such as, what departure time is preferable. Due to this request, dialog manager 30 determines that the state of the dialogue is time-oriented. Dialog manager 30 provides dialogue context weights 169 in order to inform the proper processes to more heavily weight the detected time-oriented words.

Synthesis of Tag-components

Figure 5:
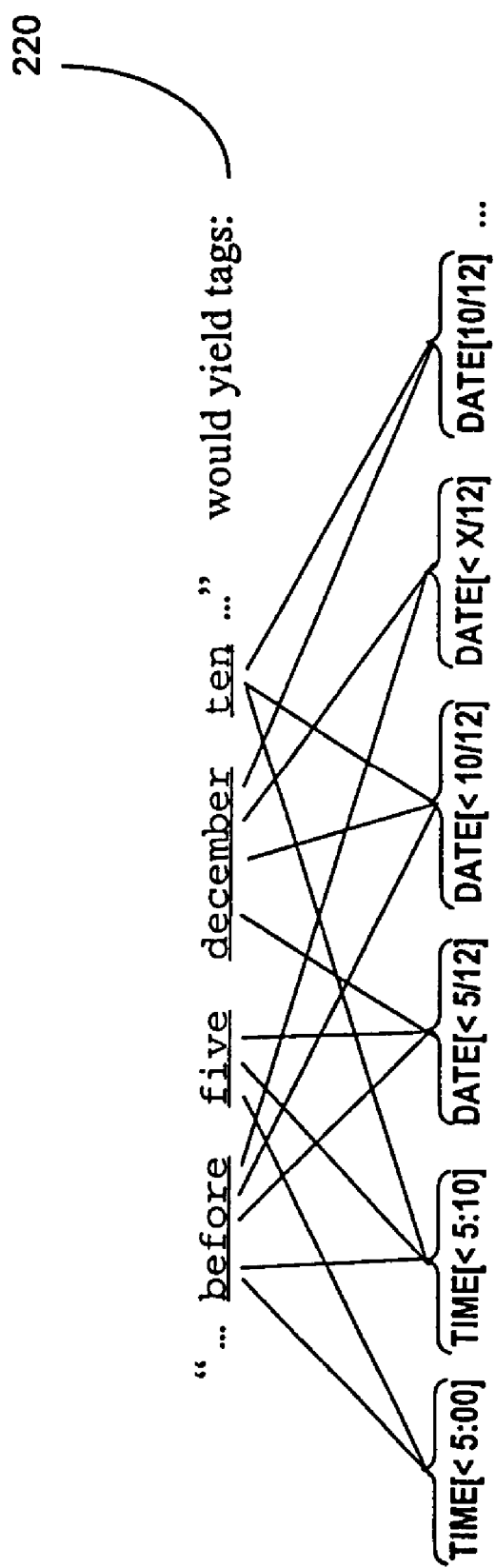
FIG. 5 is a tag generation diagram depicting the application of the semantic tag generation process to an input sentence.

The topic spotting parser of the previous stage generates a significant amount of information that needs to be analyzed and combined together to form the final output of the local parser. The present invention is preferably as "aggressive" as possible in spotting each topic resulting in the generation of multiple tag candidates. Additionally in the presence of numbers or certain key-words, such as "between", "before", "and", "or", "around", etc., and especially if these words have been introduced or dropped due to recognition errors it is possible to construct many alternative tag candidates. For example, the input sentence 220 in FIG. 5 could have been a result of insertion or deletion errors. The combining phase of the present invention determines which tags form a more meaningful interpretation of the input. The present invention defines heuristics and makes a selection based on them using a N-Best candidate selection process. Each generated tag corresponds to a set of words in the input word string, called the tag's cover-set.

A heuristic is used that takes into account the cover-sets of the tags used to generate a score. The score roughly depends on the size of the cover-set, the sizes in the number of the words of the gaps within the covered items, and the weights assigned to the presence of certain keywords. In the preferred embodiment, ASR-derived confidence vector and dialog context information are utilized to assign priorities to the tags. For example applying cost-tags parsing first potentially removes cost-related numbers that are easier to identify uniquely from the input stream, and leaves fewer numbers to create ambiguities with other tags. Preferably, dialog context information is used to adjust the priorities.

N-Best Candidates Selection

With reference back to FIG. 4, at the end of each pass, an N-best processor 170 selects the N-best candidates based upon the scores associated with the tags and generates the topic-tags, each representing the information found in the corresponding parse-tree. Once topics have been discovered this way, the corresponding words in the input can be substituted with the tag information. This substitution transformation eliminates the corresponding words from the current input text. The output 180 of each pass is fed-back to the next pass as the new input, since the substitutions may help in the elimination of certain ambiguities among competing grammars or help generate better parse-trees by filtering out overlapping symbols.

Computation ceases when no additional tags are generated in the last pass. The output of the final pass becomes the output of the local parser to global parser 62. Since each phase can only reduce the number of words in its input and the length of the input text is finite, the number of passes in the fixed-point computation is linearly bounded by the size of its input.

The following novel scoring factors are used to rank the alternative parse trees based on the following attributes of a parse-tree:
  Number of terminal symbols.
  Number or non-terminal symbols.
  The depth of the parse-tree.
  The size of the gaps in the terminal symbols.
  ASR-Confidence measures associated with each terminal symbol.
  Context-adjustable weights associated with each terminal and non-terminal symbol.

Each path preferably corresponds to a separate topic that can be developed independently, operating on a small amount of data, in a computationally inexpensive way. The architecture of the present invention is flexible and modular so incorporating additional paths and grammars, for new topics, or changing heuristics for particular topics is straight forward, this also allows developing reusable components that can be shared among different systems easily.

Figure 6:
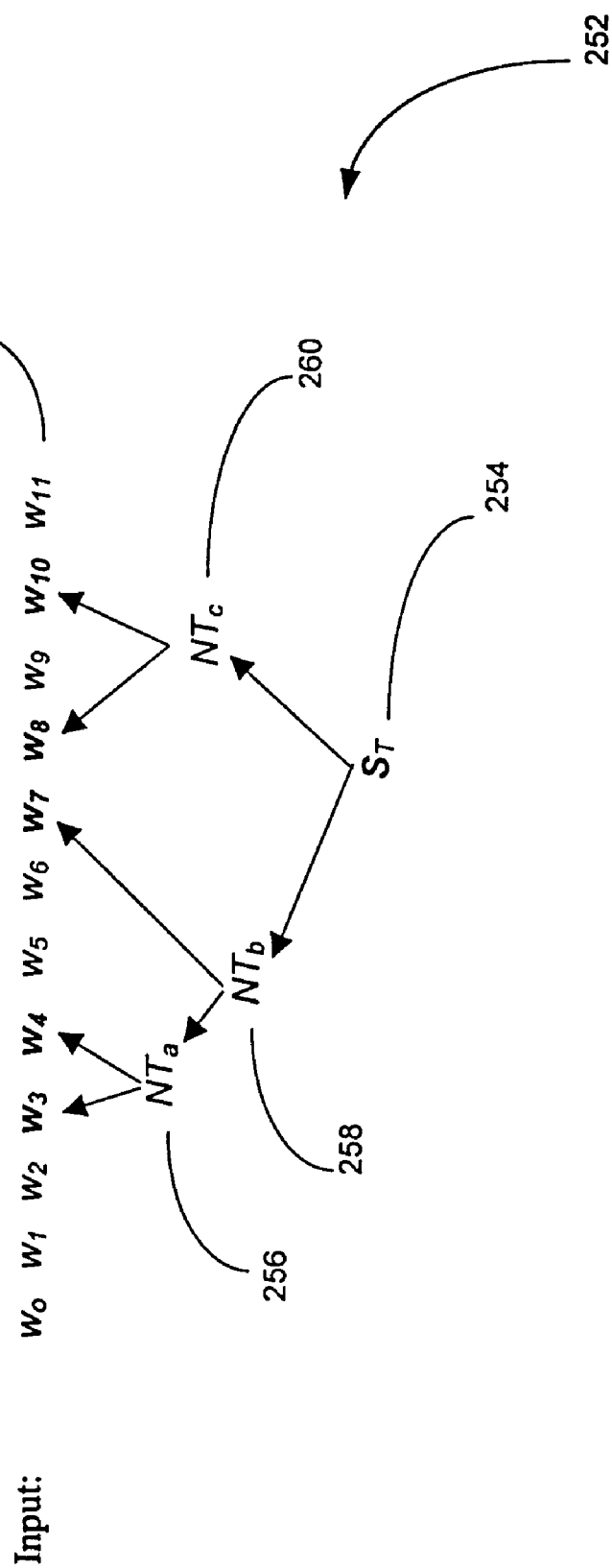
FIG. 6 is a parse tree diagram depicting a model for a parse tree for an input sentence.

FIG. 6 provides a non-limiting depiction of a tree in relation to a discussion to the tag scoring heuristics. FIG. 6 depicts an input string 250 and a sample parse-tree 252. The parse-tree rooted as St 254 identifies the sub-sequence {w3, w4, w7, w8, w10}, as a possible parse. This parse has 5 terminal symbols {w3, w4, w7, w8, w10}, with gaps between w4 & w7 (size=2) and between w8 and w10 (size=1), or total gapsize of 3. Parse tree 252 has four non-terminals: St 254, $NT_a$ 256, $NT_b$ 258, and $NT_c$ 260. The depth of parse tree 252 is three due to the traversal from St 254 to $NT_f$ 258 to $NT_a$ 256 to W3.

A possible score for this parse is: #Terminals*10−(GapSize*1.5)−Depth +#Non-terminals =50−4.5−3+4=46.5

The present invention also includes utilizing non-uniform weights which can be assigned to the non-terminal and terminal nodes. Also, confidence measures are preferably utilized to adjust the weights of one or more of the scoring factors. For example, a likelihood ratio algorithm can be utilized to compute confidence scores (see, for example, the following reference: R. Sukkar and Chin-Hui Lee, *Vocabulary Independent Discriminative Utterance Verification for Non-Key Word Rejection in Sub-Word Based Speech Recognition*, IEEE Transactions on Speech and Audio Processing, Vol. 4, No. 6, pages 420–29 (1996)).

Figure 7:
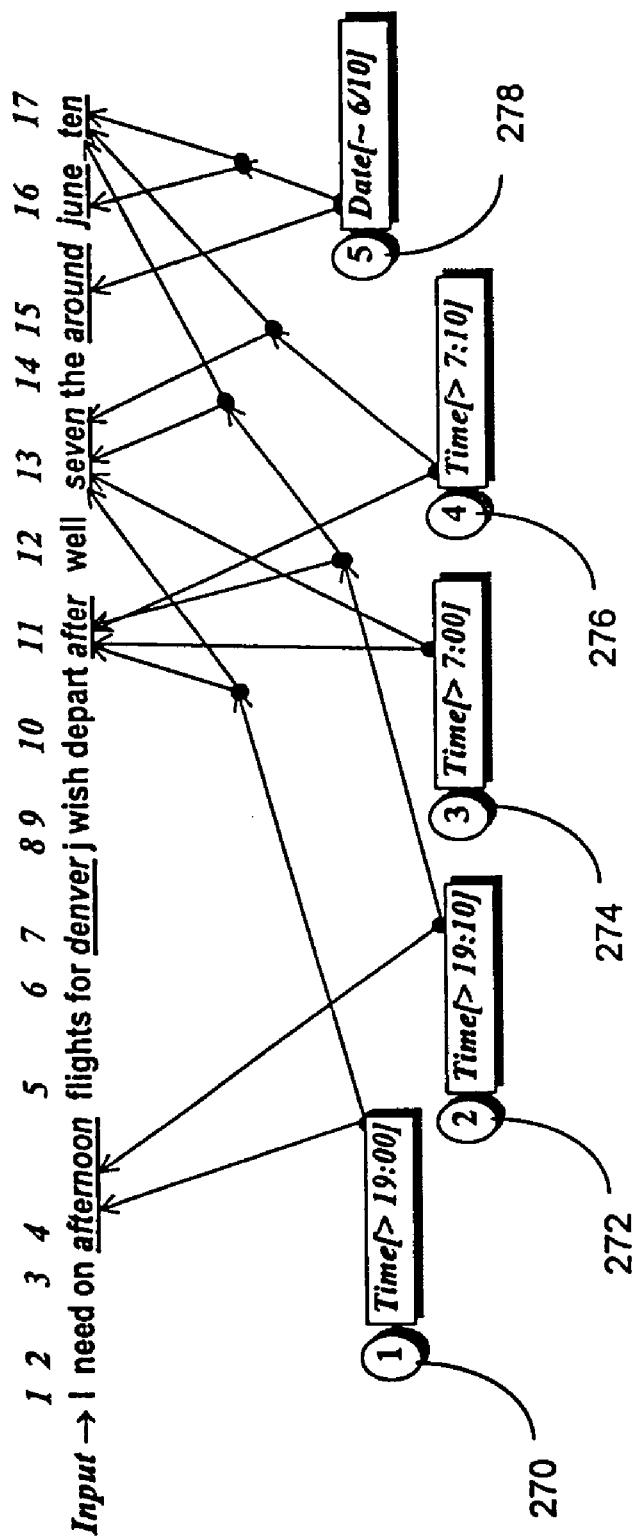
FIG. 7 is a parse tree diagram depicting multiple tags being generated as candidates during intermediate stages of local parsing.

FIG. 7 provides another non-limiting depiction of a tree in relation to a discussion to the scoring heuristics. Five parse trees are shown at reference numerals 270, 272, 274, 276, and 278. With respect to the five possible parse trees and corresponding tags shown in FIG. 7, the following scoring approach is used:

| # | Tag | # words | # NT | Depth | Gap | Score | Rank |
|---|---|---|---|---|---|---|---|
| 1 | Time [>19:00] | 3 | 2 | 2 | 7 | 30 + 2 − 2 − 10.5 = 19.5 | 4 |
| 2 | Time [>19:10] | 4 | 3 | 3 | 10 | 40 + 3 − 3 − 15 = 25.0 | 2 |
| 3 | Time [>7:00] | 2 | 1 | 1 | 1 | 20 + 1 − 1 − 1.5 = 18.5 | 5 |
| 4 | Time [>7:10] | 3 | 2 | 2 | 4 | 30 + 2 − 2 − 6 = 20.0 | 3 |
| 5 | Date [~6/10] | 3 | 2 | 2 | 0 | 30 + 2 − 2 − 0 = 30 | 1 |

The score based system results in Tag#5 being picked as the best candidate for Date targets, this selection eliminates Tag#2 and Tag#4 from further consideration due to the overlap with Tag#1 lexicon. This leaves the parse for Tag#1 as the next best parse, so Tags #5 and #1 are selected.

Figure 8:
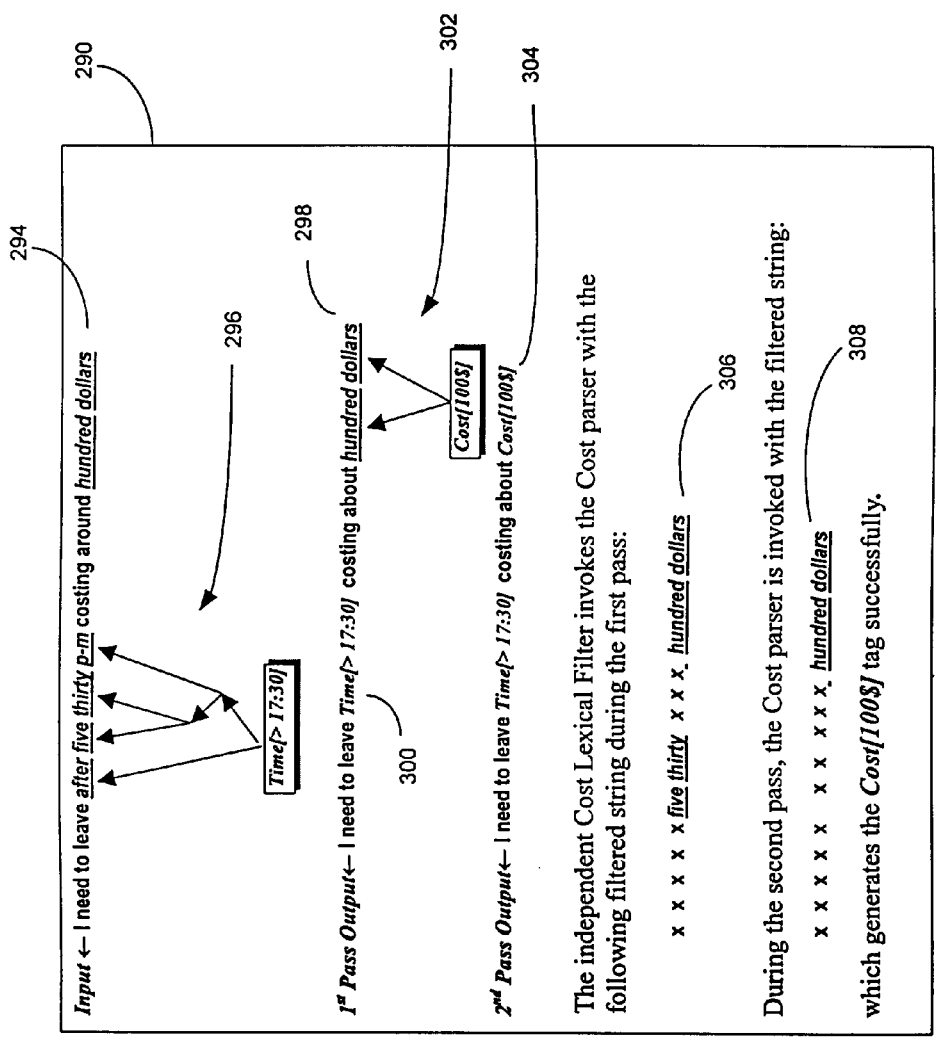
FIG. 8 is a process diagram depicting the output at different intervals for the present invention.

The present invention utilizes multiple-passes as illustrated in FIG. 8. At reference numeral 290, outputs of the present invention are depicted at different passes in processing input sentence 294. Parse tree forest 296 is generated during the first pass and helps to generate first pass output 298. First pass output 298 has associated time tag 300 with the words of input sentence 294 "Five thirty pm".

First pass output 298 is used as an input for a second pass processing of input sentence 294. Parse forest 302 is generated during processing of the second pass and results in a cost tag 304 being generated. In one embodiment of the present invention, the reason why the first pass processing did not parse the hundred dollars part of input sentence 294 is due to N-best tag selection and combining block 170 of FIG. 4. During the first phase, due to lexical filtering and aggressive parsing, the best cost parse is "five hundred dollars", and the best time parse is parse tree forest 296 for "after five thirty p-m". Since the word "five" is shared, the selection process invalidates the best cost parse and generates the time tag for "five thirty p-m". However, the end of the second pass results in a filtered string 308 which generates the cost tag 304 successfully.

Grammar

In the preferred embodiment, each topic is expressed as a generalized LR(0) grammar using the following syntax:

```
TopicGrammar = Rule+.
    Rule = "*" ID "."|
        ID"."|
        ID"=" ID* ("|" ID*)* "."|
        ID"." ID+ ".".
```

The grammar syntax informally states that the grammar is expressed as a series of grammar rules, where each grammar rule either describes a context-sensitive substitution rule for a terminal or a non-terminal grammar symbol.

FIG. 9 depicts an exemplary grammar for parsing the cost involving dollar or yen amounts. The first rule <* COST.>320 declares the root non-terminal symbol to be COST.

Each subsequent rule of the form <A=X Y Z.> specifies a non-terminal symbol, A, and a substitution rule where the symbol A can be substituted in a rightmost derivation by the three right hand side grammar symbols, X Y Z, each of which is either a terminal or non-terminal symbol. For example, the rule 324:

```
C_Gen = C_Num |
    C_Num C_Currency.
``` defines C_Gen as a non-terminal that can be reduced with either a number (C_Num) or a number followed by a currency symbol (C_Currency). Terminal symbols are defined using the <t: s1 s2.> For example, the rule 328:

```
c_yen: yen yens.
``` defines c_yen to be a terminal symbol matching the "yen" or "yens" as a next token in the input stream.

The cost grammar matches all words that are not defined as terminals under the X rule. A lexical filter is used to convert all input words that are not relevant to COST rules with the word "x". Accordingly, the X rule matches one or more consecutive "x"s.

Figure 10:
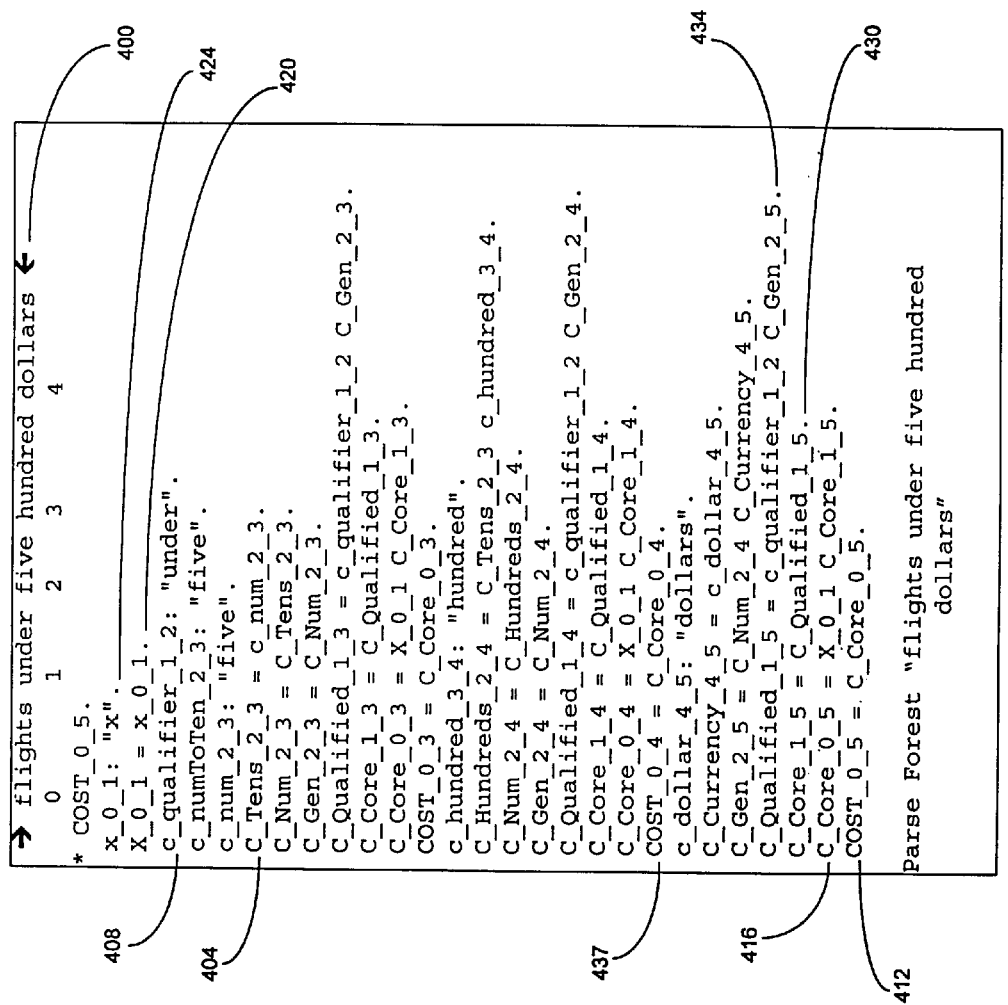
FIG. 10 is a computer screen display of a parse forest generated for an input sentence.

FIG. 10 shows a non-limiting example of parsing the sentence 400: "flights under five hundred dollars." Each line represents the application of a grammar rule, for example at reference numeral 404:

```
C_Tens_2_3=c_num_2_3.
``` represents a node in the parse forest where the grammar symbol C_Tens covers the range [2–3], i.e. the word "five". Similarly line 408:

```
c_qualifier_1_2: "under".
``` represents terminal symbol c_qualifier matching the range [1–2], i.e. the word "under". The root symbol rule 412, COST_0_5 covers the entire range signalling a successful parse which yielded a unique parse for the entire input. Other root symbols rules are depicted which have their own parse trees shown in FIG. 10. For example, FIG. 10 depicts a parse tree for root symbol 437. If multiple parses are used, a rule contains the alternatives shown with "|"s. Also notice in a non-limiting manner how the first word, "flights", is skipped over by the X rule.

Figure 11:
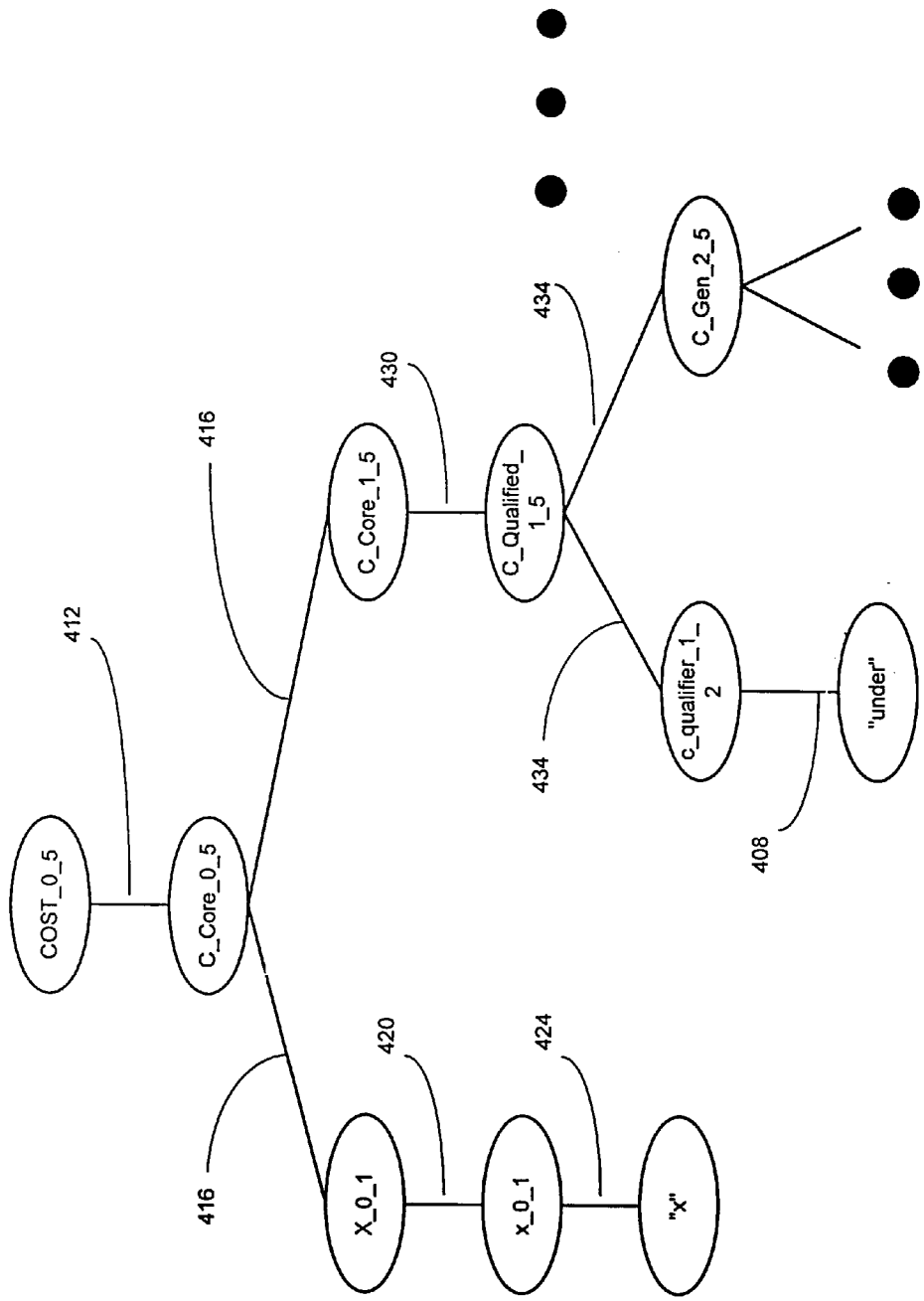
FIG. 11 is a graphical parse forest showing a partial representation in a graphical format of the parse forest in FIG. 10.

FIG. 11 shows a partial graphical tree depiction of the data of FIG. 10. For example, root symbol rule is depicted by reference numeral 412 on FIG. 11.

Tag Generation

The preferred tag generation method uses a parse forest, and generates the tags as specified by the output specifications. The tag generation algorithm (called reduce) uses a synthesis and inheritance approach in order to construct each tag utilizing the information found in the parse tree (note: the usage of the name "reduce" herein is separate and different from the term reduce (as in shift/reduce actions) used in the LR parsing literature). The reduce algorithm used by the tag generation method operates as follows:

Input: node: $\alpha\_i\_j$ (any node in the parse forest.)

1. If $\alpha\_i\_j$ is a terminal rule, return the right-hand-side (which is a token at the input stream at position i) either unchanged, or by assigning it a meaning—for example applying a conversion from ascii to numeric for a digit, etc.,)
2. remove all the X-rules from the right-hand-side, yielding a rule of the form $$\alpha\_i\_j = \beta_0\_i_0\_j_0 \beta_1\_i_1\_j_1 \ldots \beta_k\_i_k\_j_k.$$

where, $\beta \neq x$.
3. Evaluate new attribute, $\alpha$, for $\alpha\_i\_j$ by concatenating results from reducing the terms on the right-hand-side, i.e.:

$$\alpha\_i\_j \cdot \alpha = \Sigma_{i=0 \ldots k} \text{reduce}(\beta_i\_i_i\_j_i)$$

where: $\Sigma$ is a concatenation operator.
4. Inherit all the attributes from each reduced term on the right-hand-side.
    for each term, $\beta_i\_i_i\_j_i$ in the right-hand-side
        for each attribute, $\phi \in \beta_i\_i_i\_j_i$.AttrList
    add $\phi$ to the node's attribute list:
        $\alpha\_i\_j$.AttrList $\cup = \phi$
    inherit the attribute value:
        $\alpha\_i\_j \cdot \phi = \beta_i\_i_i\_j_i \cdot \phi$
5. If necessary generate new attributes for $\alpha\_i\_j$ possibly utilizing the inherited and computed attributes. All new attributes are inherited by the parent nodes, all the way up to the root node. This is the general mechanism by which we can construct and initialize the tag structures.

Figure 12:
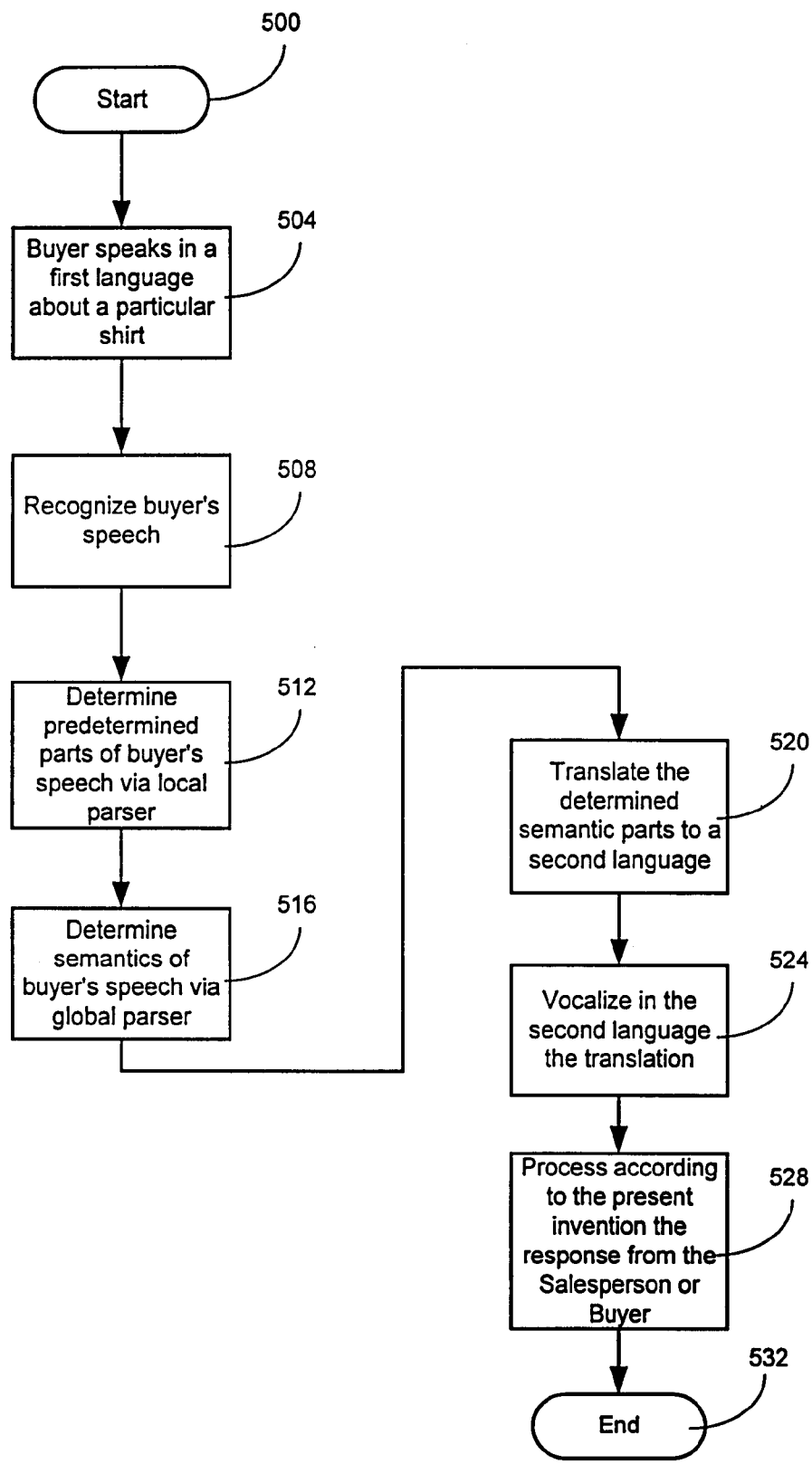
FIG. 12 is a flow chart depicting the operational steps associated with the present invention being utilized in an exemplary application.

FIG. 12 depicts operation of the present invention within an exemplary application of a buyer attempting to buy a particular shirt while speaking in a first language to a seller who speaks in a second language. The start indication block 500 indicates process block 504 is to be processed. At process block 504, the buyer speaks in a first language about a particular shirt. At process block 508, the buyer's speech is recognized and predetermined parts of the buyer's speech is determined via the local parser of the present invention at process block 512.

Process block 516 determines the semantic portions of the buyer's speech via a global parser. Process block 520 translates the determined semantic parts to a second language which is then vocalized at process block 524. At process block 528, any response from the salesperson or buyer is processed according to the present invention. Processing terminates at process block 532.

Figure 13:
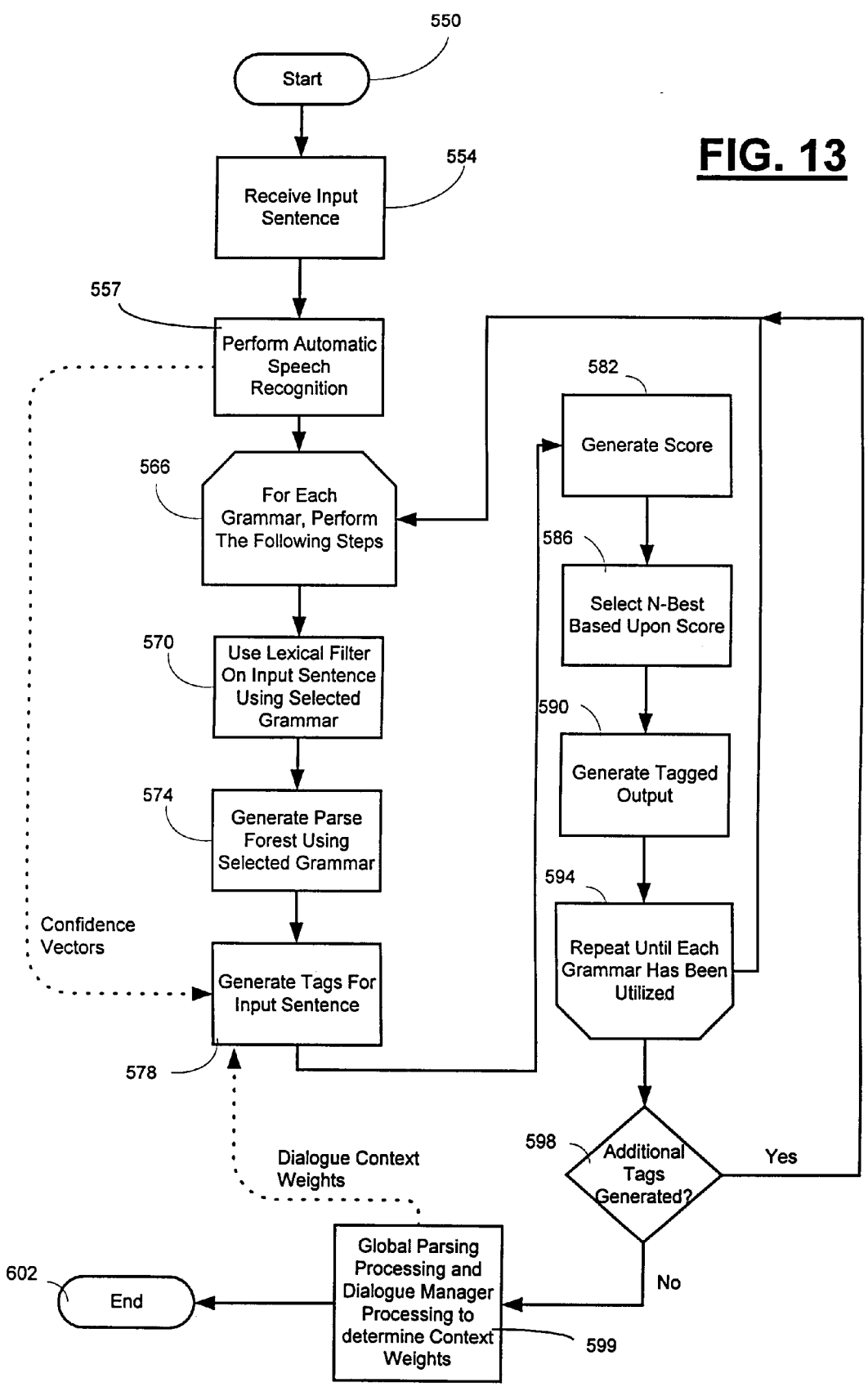
FIG. 13 is a flow chart depicting the operational steps associated with processing an input sentence using the local parser of the present invention.

FIG. 13 depicts the operational steps associated with the multi-pass architecture of the local parser of the present invention. Start indication block 550 indicates that process block 554 is to be executed wherein an input sentence is received. Process block 567 performs automatic speech recognition for the input sentence.

Iteration block 566 performs for each grammar the following steps. Preferably, the processing for each grammar is performed substantially concurrently with the processing for a second grammar. Process block 570 utilizes a lexical filter on the input sentence using the grammar as selected by iteration block 566.

Process block 574 generates a parse forest using the selected grammar, and process block 578 generates tags for the input sentence using confidence vectors from process block 557 and using dialogue context weights from process block 599 (if available from previous processing of the dialogue manager). It is to be understood, however, that the present invention is not limited to using context-related data at this stage in processing, but also includes utilizing no context information at this stage.

Process block 582 generates a score for the tags that were generated at process block 578. Process block 586 selects the N-best tags based upon the score generated by process block 582. Process block 590 generates the tag output, and iteration terminator block 594 repeats the process until each grammar has been utilized.

If each grammar has been utilized for a particular pass, then decision block 598 inquires whether any additional tags have been generated. If additional tags have been generated, then processing continues at iteration block 566. If no additional tags were generated, then processing continues at process block 599. At process block 599, global parsing is performed, and then the dialog manager processing is performed wherein context weights are determined that could be used, if needed, in the next processing of an input sentence. Processing terminates at end block 602.

While the invention has been described in its presently preferred form, it is to be understood that there are numerous applications and implementations for the present invention. Accordingly, the invention is capable of modification and changes without departing from the spirit of the invention as set forth in the appended claims.

Exhibit A

Input: Ascii-text string, s, containing a sequence of white-space seperated words, $w_i$, without any punctuation marks. The words are comprised of lower-case letters of English alphabet and the single-quote character. [note: no digits]

where
$s = w_0 \, w_1 \, \ldots \, w_n$
$w = [a-z']+$

Output: Ascii-text string, out, containing a sequence of white-space separated words or tags without punctuation marks.

```
where out = wt₀ wt₁ ... wtₘ
    wt = w|t
    w = [a-z']+
    t =   dateTag |
          timeTag |
          costTag |
          flightNumTag |
          cityNameTag |
          airlineTag |
          stopTag |
          classTag |
          mealTag |
          typeTag
    dateTag = DATE [d] |         ;plain date
              DATE[d-d] |        ;date range
              DATE[< d] |        ;before date
              DATE[> d] |        ;after date
              DATE[- d] |        ;around date
              DATE[d] ||DATE[d] | ;alternative dates
              DATE[MIN()]        ;earliest date
          d = dy/mo |            ;date=day & month
              X/mo               ;any day of the month
          dy = 1|2|3| ... | 31
          mo = 1|2| ... 12
    timeTag =  TIME[t] |         ;plain time
               TIME[t-t] |       ;time range
               TIME[< t] |       ;before time
               TIME[> t] |       ;after time
               TIME[- t] |       ;around time
               TIME[t]||TIME[t]  ;alternative times
               TIME[MIN()]       ;earliest
               TIME[MAX()]       ;latest
          t = hrs:min            ;
    time=hrs:minutes
          hrs =  1|2|3| ... | 24
          min = 01|02| ... 59
    costTag =  COST[c] |         ;plain cost
               COST[c-c] |       ;cost range
               COST[< c] |       ;under the amount
               COST[> c] |       ;over the amount
               COST[- c] |       ;around cost
               COST[MIN()]       ;cheapest
               COST[MAX()]       ;most expensive
          c = amountY |          ;amount in yens
              amount$            ;amount in dollars
    amount = 1|2|3| ... | 99999
    flightNumTag = FNUM[fnum]
          fnum = 1|2|3| ... | 9999
    cityNameTag = CITY[cityName]
          cityName = ATLANTA | BALTIMORE BANGKOK |
                     BOSTON |
                     CHICAGO | DALLAS | DENVER | HONG
                     KONG| HOUSTON | LOS_ANGELES |
                     L_A | MIAMI |
                     NEW_ORLEANS | NEW_YORK |
                     NEW_YORK_CITY|
                     OAKLAND | OSAKA | PHILADELPHIA |
                     SEOUL |
                     PITTSBURGH | SAN_FRANCISCO |
                     WASHINGTON|
                     SINGAPORE | TOKYO| TORONTO |
                     VANCOUVER|
    airlineTag = CITY[airlineName]
          airlineName = AMERICAN_AIRLINES | U_S_AIR |
                        JAPAN_AIRLINES |
                        CONTINENTAL |
                        UNITED | SINGAPORE_AIRLINES
    stopTag =  STOP[> 0] |       ;any # of stops
               STOP[= 0]         ;non-stop
    classTag = CLAS[class]       ;class
        class = first | business | economy
    mealTag = MEAL[meal]         ;meal info
         meal = dinner | lunch | breakfast
    typeTag = TYPE[oneway] | TYPE[round trip]
```

It is claimed:

1. A computer-implemented speech parsing method for processing an input phrase, comprising the steps of:
   (a) providing a plurality of grammars indicative of predetermined topics;
   (b) generating a plurality of parse forests related to said input phrase using said grammars;
   (c) associating tags with words in said input phrase using said generated parse forests;
   (d) using said tags associated with said words as a parsed representation of said input phrase;
   (e) generating scores for said tags based upon attributes of said parse forest, said attributes comprising a plurality of score based factors selected from the group consisting of number of terminals, gap size, depth, number of non-terminals and combinations thereof;

(f) selecting said tags for use in said parsed representation based upon said generated scores; and (g) extracting overall semantics of the input phrase by using task related topics of the parsed representation to recognize a goal-oriented task with certain constraints.

2. The speech parsing method of claim 1 further comprising the step of:

weighting at least two of said factors differently.

3. The speech parsing method of claim 2 further comprising the step of:

using context information to weigh at least two of said factors differently.

4. The speech parsing method of claim 3 further comprising the steps of:

generating a word confidence vector for said input phrase substantially during speech recognition of said input phrase; and weighting at least two of said factors differently based upon said generated word confidence vector.

5. The speech parsing method of claim 4 further comprising the steps of:

generating a request for information related to a predetermined topic;

generating dialogue context weights based upon said generated request for information; and weighting at least two of said factors differently based upon said generated dialogue context weights.

6. The speech parsing method of claim 3 further comprising the steps of:

generating a request for information related to a predetermined topic;

generating dialogue context weights based upon said generated request for information; and weighting at least two of said factors differently based upon said generated dialogue context weights.

7. The speech parsing method of claim 3 further comprising the steps of:

using said context information substantially in parallel to performing said step (b).

8. A computer-implemented speech parsing apparatus for processing an input phrase, comprising:

a plurality of grammars indicative of predetermined topics;

a parse forest generator for generating a plurality of parse forests related to said input phrase using said grammars;

a tag generator for associating tags with words in said input phrase using said parse forests, wherein said tags associated with said words are used as a parsed representation of said input phrase;

a tag score generator for generating scores for said tags;

a global parser for extracting overall semantics of the input phrase by using task related topics of the parsed representation to recognize a goal-oriented task with certain constraints;

a tag selector for selecting tags for use in said parsed representation based upon said generated scores; and said tag score generator generates scores for said tags based upon attributes of said parse forests; said attributes comprising score based factors selected from the group consisting of number of terminals, gap size, depth, number of non-terminals; and combinations thereof.

9. The speech parsing apparatus of claim 8 wherein said tag score generator weights at least two of said factors differently.

10. The speech parsing apparatus of claim 9 wherein said tag score generator uses context information to weight at least two of said factors differently.

11. The speech parsing apparatus of claim 10 further comprising:

a speech recognition module for performing speech recognition of said input phrase and for generating a word confidence vector for said input phrase substantially, said tag score generator weighting at least two of said factors differently based upon said generated word confidence vector.

12. The speech parsing apparatus of claim 11 further comprising:

a dialogue manager for generating a request for information related to a predetermined topic, said dialogue manager generating dialogue context weights based upon said generated request for information, said tag score generator weighting at least two of said factors differently based upon said generated dialogue context weights.

13. The speech parsing apparatus of claim 10 further comprising:

a dialogue manager for generating a request for information related to a predetermined topic, said dialogue manager generating dialogue context weights based upon said generated request for information, said tag score generator weighting at least two of said factors differently based upon said generated dialogue context weights.

14. A computer-implemented speech parsing method for processing an input phrase, comprising the steps of:

(a) providing a plurality of grammars indicative of predetermined topics;

(b) generating a plurality of parse forests related to said input phrase using said grammars in cooperation with at least one global parser and at least one local parser;

(c) associating tags with words in said input phrase using said generated parse forests; and (d) using said tags associated with said words as a parsed representation of said input phrase, said local parser identifying a plurality of predetermined relevant task-related fragments.

15. The speech parsing method of claim 14 wherein said local parser utilizing said grammars in a plurality of iterations in association with a scoring mechanism.

16. The speech parsing method of claim 15 wherein said grammars are relatively small in size.

17. The speech parsing method of claim 14 further comprising the step of:

performing said step (b) a plurality of iterations so that each iteration produces alternate parse forests.

18. The speech parsing method of claim 14 wherein said step (b) is performed substantially concurrently for each of said grammars.

19. The speech parsing method of claim 18 further comprising the step of:

performing said step (b) a plurality of iterations wherein each iteration produces alternate parse forests with respect to each of said grammars.

20. The speech parsing method of claim 14 further comprising the steps of:
   generating scores for said tags; and
   selecting tags for use in said parsed representation based upon said generated scores.

21. The speech parsing method of claim 20 further comprising the step of:
   generating scores for said tags based upon attributes of said parse forests.

22. The speech parsing method of claim 21 further comprising the step of:
   generating scores for said tags based upon score based factors selected from the group consisting of number of terminals, gap size, depth, number of non-terminals, and combinations thereof.

23. The speech parsing method of claim 22 further comprising the step of:
   weighting at least two of said factors differently.

24. The speech parsing method of claim 23 further comprising the step of:
   using context information to weigh at least two of said factors differently.

25. The speech parsing method of claim 24 further comprising the steps of:
   generating a word confidence vector for said input phrase substantially during speech recognition of said input phrase; and
   weighting at least two of said factors differently based upon said generated word confidence vector.

26. The speech parsing method of claim 25 further comprising the steps of:
   generating a request for information related to a predetermined topic;
   generating dialogue context weights based upon said generated request for information; and
   weighting at least two of said factors differently based upon said generated dialogue context weights.

27. The speech parsing method of claim 24 further comprising the steps of:
   generating a request for information related to a predetermined topic;
   generating dialogue context weights based upon said generated request for information; and
   weighting at least two of said factors differently based upon said generated dialogue context weights.

28. The speech parsing method of claim 24 further comprising the steps of:
   using said context information substantially in parallel to performing said step (b).

29. The speech parsing method of claim 14 further comprising the steps of:
   generating scores for said tags; and
   selecting N-best tags for use in said parsed representation based upon said generated scores.

30. The speech parsing method of claim 29 further comprising the steps of:
   performing said steps (b) and (c) a plurality of iterations; and
   using said selected N-best tags of a first iteration as input related to processing said steps (b) and (c) of a second iteration.

31. The speech parsing method of claim 14 wherein said tags are indicative of said topics of said grammars.

32. The speech parsing method of claim 14 wherein said input phrase is grammatically incorrect with respect to at least a portion of said input phrase, said method further comprising the steps of:
   generating a plurality of parse forests related to said grammatically incorrect input phrase using said grammars;
   associating tags with words in said grammatically incorrect input phrase using said generated parse forests; and
   using said tags associated with said words as a parsed representation of said grammatically incorrect input phrase.

33. The speech parsing method of claim 14 wherein said grammars are based upon left-right context-sensitive grammars.

34. The speech parsing method of claim 14 wherein said grammars are based upon left-right context-sensitive grammars and contain ambiguities.

35. The speech parsing method of claim 14 further comprising the steps of:
   filtering said input phrase via lexical filters; and
   generating said plurality of parse forests based upon said filtered input phrase.

36. The speech parsing method of claim 14 further comprising the step of:
   extracting semantic components of said input phrase based upon said tags that are associated with said words.

37. The speech parsing method of claim 14 further comprising the step of:
   providing said global parser for extracting said semantic components from said input phrase based upon said tags that are associated with said words.

38. The speech parsing method of claim 14 further comprising the step of:
   managing based upon said extracted semantic components the exchange of dialogue between a speech recognizer device and a user.

39. The speech parsing method of claim 37 further comprising the step of:
   managing based upon said extracted semantic components the exchange of dialogue between two users who speak different languages.

40. A computer-implemented speech parsing apparatus for processing an input phrase, comprising:
   a plurality of grammars indicative of predetermined topics;
   a parse forest generator for generating a plurality of parse forests related to said input phrase using said grammars in cooperation with at least one global parser and at least one local parser;
   a tag generator for associating tags with words in said input phrase using said generated parse forests, wherein said tags associated with said words are used as a parsed representation of said input phrase; and
   said local parser utilizing said grammars in a plurality of iterations in association with a scoring mechanism.

41. The speech parsing apparatus of claim 40 wherein said parse forest generator is executed a plurality of iterations such that each iteration produces alternate parse forests.

42. The speech parsing apparatus of claim 40 wherein said parse forest generator is executed a plurality of iterations such that each iteration produces alternate parse forests with respect to each of said grammars.

43. The speech parsing apparatus of claim 40 further comprising:
   a tag score generator for generating scores for said tags; and a tag selector for selecting tags for use in said parsed representation based upon said generated scores.

44. The speech parsing apparatus of claim 43 wherein said tag score generator generates scores for said tags based upon attributes of said parse forests.

45. The speech parsing apparatus of claim 44 wherein said tag score generator generates scores for said tags based upon score based factors selected from the group consisting of number of terminals, gap size, depth, number of non-terminals, and combinations thereof.

46. The speech parsing apparatus of claim 45 wherein said tag score generator weights at least two of said factors differently.

47. The speech parsing apparatus of claim 46 wherein said tag score generator uses context information to weight at least two of said factors differently.

48. The speech parsing apparatus of claim 47 further comprising:

a speech recognition module for performing speech recognition of said input phrase and for generating a word confidence vector for said input phrase substantially, said tag score generator weighting at least two of said factors differently based upon said generated word confidence vector.

49. The speech parsing apparatus of claim 48 further comprising:

a dialogue manager for generating a request for information related to a predetermined topic, said dialogue manager generating dialogue context weights based upon said generated request for information, said tag score generator weighting at least two of said factors differently based upon said generated dialogue context weights.

50. The speech parsing apparatus of claim 47 further comprising:

a dialogue manager for generating a request for information related to a predetermined topic, said dialogue manager generating dialogue context weights based upon said generated request for information, said tag score generator weighting at least two of said factors differently based upon said generated dialogue context weights.

51. The speech parsing apparatus of claim 40 further comprising:

a tag score generator for generating scores for said tags; and a tag selector for selecting N-best tags for use in said parsed representation based upon said generated scores.

52. The speech parsing apparatus of claim 51 wherein said parse forest generator and said tag generator are executed a plurality of iterations, said selected N-best tags of a first iteration are used as input to said parse forest generator and said tag generator during a second iteration.

53. The speech parsing apparatus of claim 40 wherein said tags are indicative of said topics of said grammars.

54. The speech parsing apparatus of claim 40 wherein said input phrase is grammatically incorrect with respect to at least a portion of said input phrase, said parse forest generators generating a plurality of parse forests related to said grammatically incorrect input phrase using said grammars, said tag generator associating tags with words in said grammatically incorrect input phrase using said generated parse forests, said tags being associated with said words as a parsed representation of said grammatically incorrect input phrase.

55. The speech parsing apparatus of claim 40 wherein said grammars are based upon left-right context-sensitive grammars.

56. The speech parsing apparatus of claim 40 wherein said grammars are based upon left-right context-sensitive grammars and contain ambiguities.

57. The speech parsing apparatus of claim 40 further comprising:

a lexical filter for filtering said input phrase, said parse forest generator generating said plurality of parse forests based upon said filtered input phrase.

58. The speech parsing apparatus of claim 40 further comprising:

a semantic extractor for extracting semantic components of said input phrase based upon said tags that are associated with said words.

59. The speech parsing apparatus of claim 48 further comprising:

said global parser extracting said semantic components from said input phrase based upon said tags that are associated with said words.

60. The speech parsing apparatus of claim 59 further comprising:

a dialogue manager for managing based upon said extracted semantic components the exchange of dialogue between a speech recognizer device and a user.

61. The speech parsing apparatus of claim 59 further comprising:

a dialogue manager for managing based upon said extracted semantic components the exchange of dialogue between two users who speak different languages.

* * * * *

UNITED STATES PATENT AND TRADEMARK OFFICE
CERTIFICATE OF CORRECTION

PATENT NO. : 6,631,346 B1
DATED : October 7, 2003
INVENTOR(S) : Karaorman et al.

It is certified that error appears in the above-identified patent and that said Letters Patent is hereby corrected as shown below:

Title page,
Item [56], References Cited, U.S. PATENT DOCUMENTS, insert the following references:

--5,761,631   6/1998    Nasukawa
      5,687,384   11/1997   Nagase
      5,652,897   7/1997    Linebarger, et al.
      5,590,039   12/1996   Ikeda, et al.
      5,060,155   10/1991   van Zuijlen
      4,914,590   4/1990    Loatman, et al.--

Column 14,
Line 50, after "fragments" insert:
    --; and
    (e) extracing overall semantics of the input phrase by using task related topics of the parsed representation to recognize a goal-oriented task with certain constraints- -.

Column 16,
Line 56, after "mechanism" insert:
    --, said global parser extracting overall semantics of the input phrase by using task related topics of the parsed representation to recognize a goal-oriented task with certain constraints--.

Column 18,
Line 34, "48" should read -- 58 --.

Signed and Sealed this

Fourteenth Day of December, 2004

JON W. DUDAS
*Director of the United States Patent and Trademark Office*